UNITED STATES PATENT OFFICE.

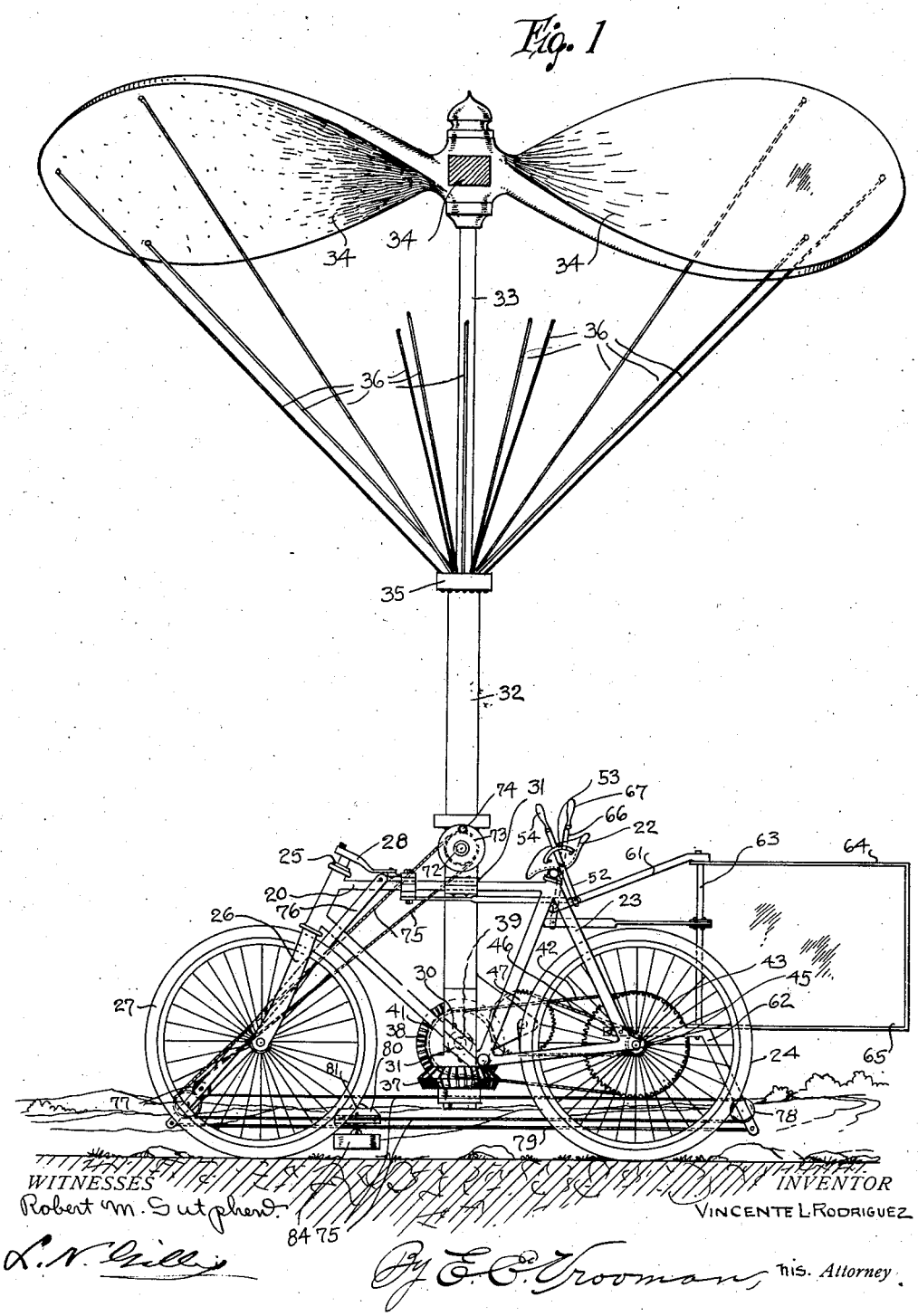

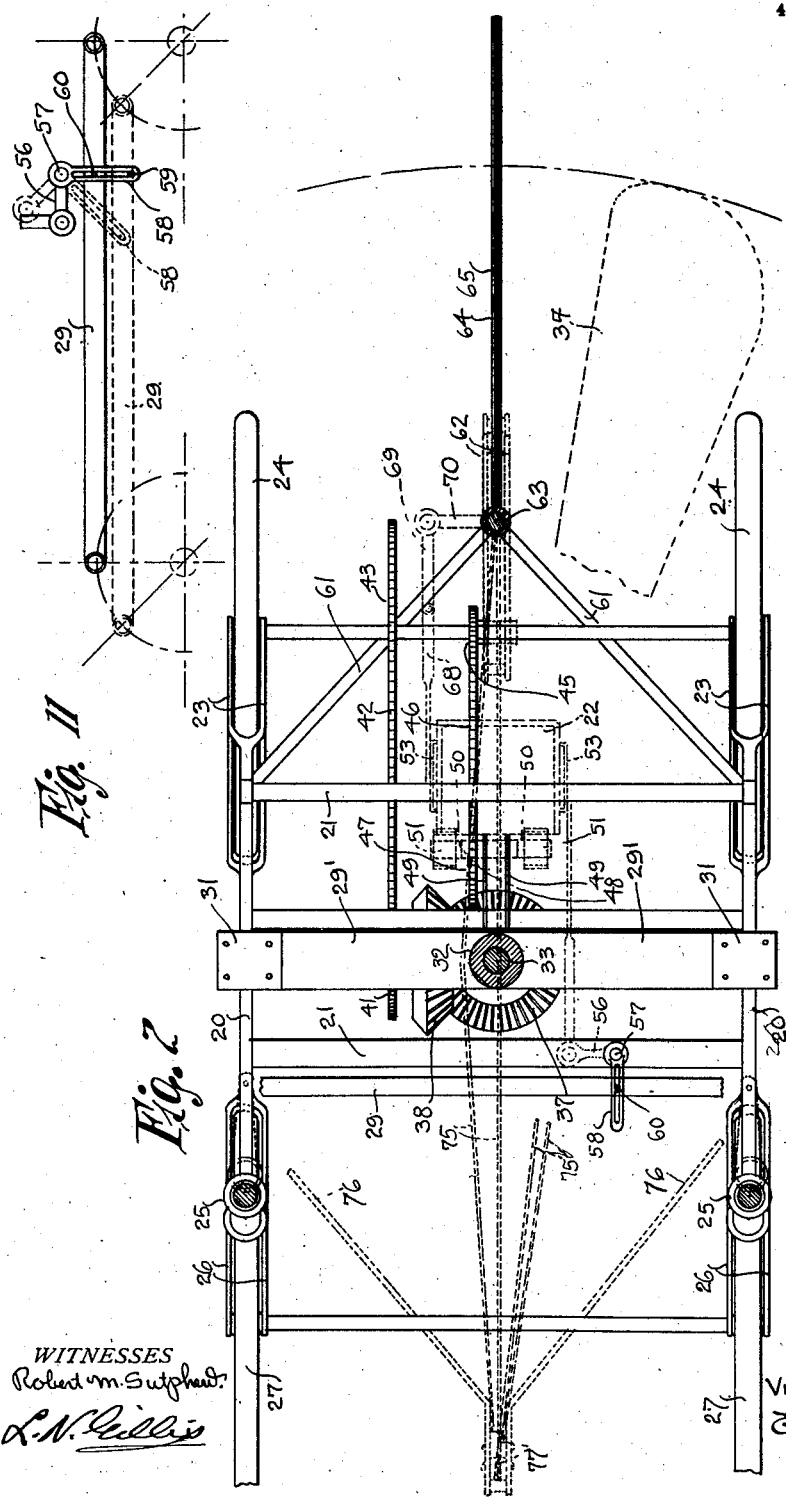

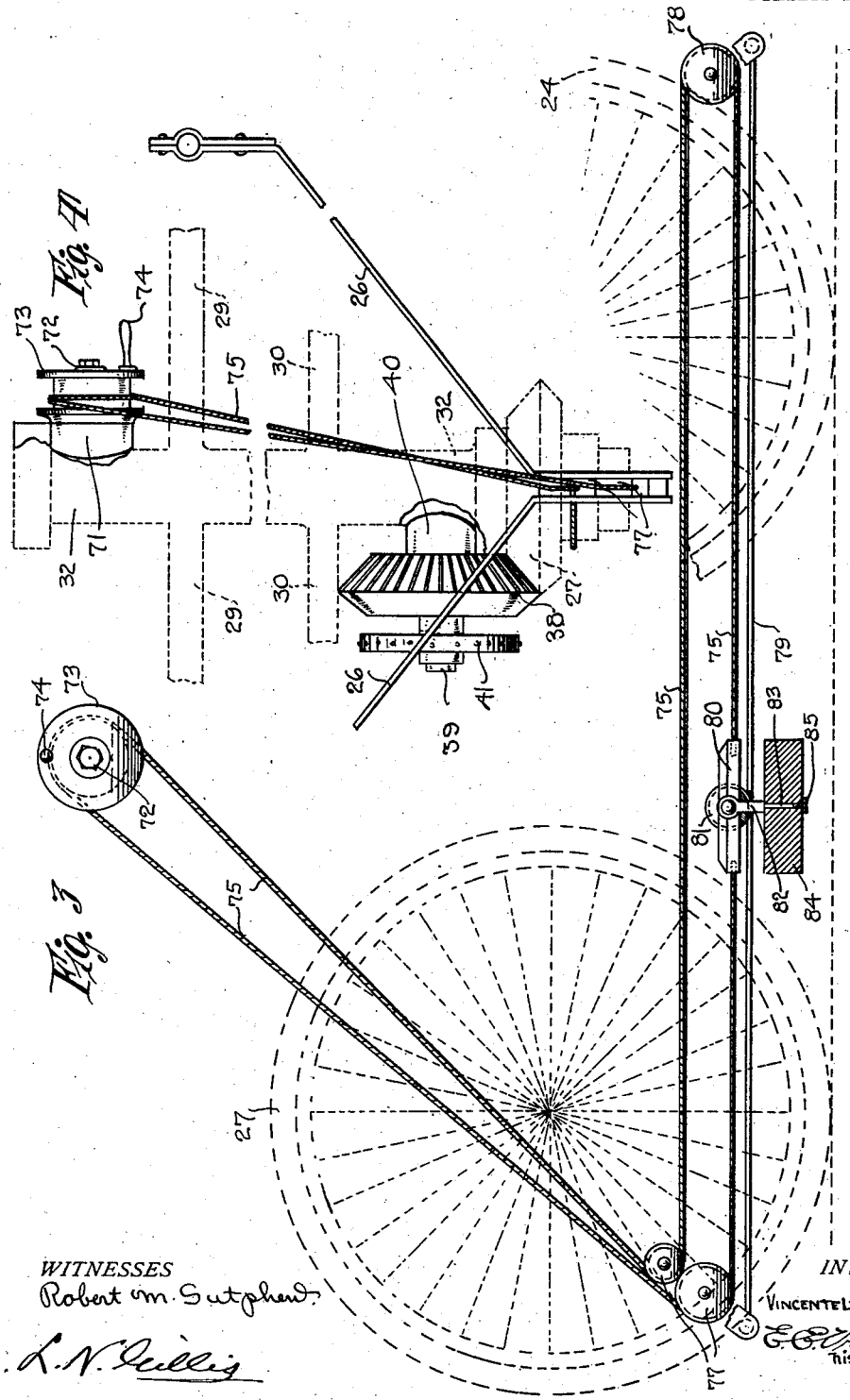

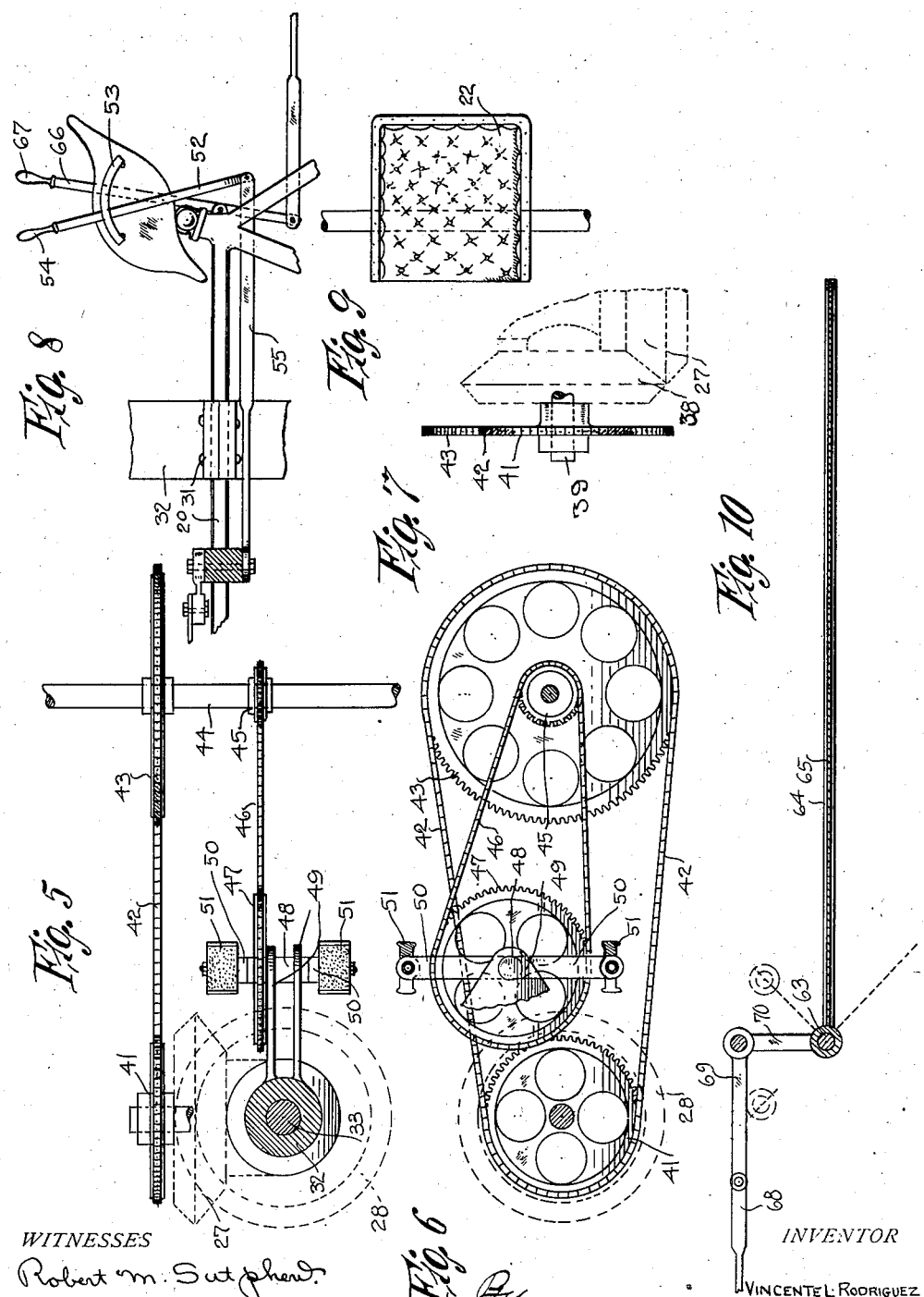

VINCENTE LENOARD RODRIGUEZ, OF DOUGLAS, ARIZONA.

FLYING-MACHINE.

1,061,870.

Specification of Letters Patent.

Patented May 13, 1913.

Application filed June 22, 1912. Serial No. 705,315.

*To all whom it may concern:*

Be it known that I, VINCENTE L. RODRIGUEZ, a citizen of the United States, residing at Douglas, in the county of Cochise and State of Arizona, have invented certain new and useful Improvements in Flying-Machines, of which the following is a specification, reference being had therein to the accompanying drawing.

This invention relates to flying machines and has special reference to a flying machine of the helicopter type.

The principal object of the invention is to improve and simplify the general construction of machines of this character.

Another object of the invention is to provide a machine of this character with an improved balancing weight whereby the center of gravity may be varied in the fore and aft direction thus enabling the helicopter shaft to be placed at different positions with reference to the horizontal.

With the above and other objects in view, this invention consists in general of certain novel constructions, combinations and arrangements of parts as will be hereinafter fully described in the specification, illustrated in the drawings, and specifically claimed.

In the accompanying drawings, like characters of reference indicate like parts in the several views, and Figure 1 is a side elevation partly in section of a flying machine constructed in accordance with this invention. Fig. 2 is a horizontal section of such a machine taken above the ground wheels. Fig. 3 is an enlarged detail side view, partly in section, of the shifting weight mechanism. Fig. 4 is a similar view at right angles to Fig. 3. Fig. 5 is an enlarged detail plan of the driving mechanism. Fig. 6 is a side view of the mechanism shown in Fig. 5. Fig. 7 is a partial end view of the mechanism shown in Fig. 5. Fig. 8 is a side elevation of the seat for the driver showing the lever arrangement used in steering the invention. Fig. 9 is a plan of the driver's seat. Fig. 10 is a detail section through the rudder used to steer the device horizontally showing the connections between the controlling lever and said rudder. Fig. 11 is a detail view showing a portion of the mechanism used to control the steering of the ground wheels.

The main frame of this invention consists of a pair of diamond-shaped bicycle frames 20 connected at suitable points by cross braces 21. Supported on one of the cross braces 21 is the driver's seat 22. In the rear fork 23 of each frame is held a driving wheel 24 while extending through the front member of each frame is a steering post 25 terminating below in a fork 26 wherein is held a wheel 27. Extending rearwardly from each of the steering posts 25 is a steering lever 28 and these steering levers are connected by means of a transverse bar 29 so that when one of the steering levers 29 is moved the other will be moved likewise. Extending between the top members of the two frames 20 is a bar 29' and a similar bar 30 connects the forward lower members. This bar 30 is an arch bar and the bars 29' and 30 are held in position by means of clips 31. Supported by the bars 29' and 30 is a sleeve 32 wherethrough extends a shaft 33 which carries on its upper end a helix 34. On the shaft 33 moreover there is provided a collar 35 firmly fixed to the shaft and from this collar to the outer ends of the helix blades extend braces 36. On the lower end of the shaft 33 there is provided a beveled gear 37 which meshes with a beveled gear 38 carried on a stub shaft 39 supported in a boss 40 formed on the lower end of the sleeve 32. Furthermore this stub shaft carries a sprocket 41 which is connected by means of a sprocket chain 42 with a sprocket 43 fixed upon a shaft 44 whereon are mounted the rear wheels 24. Furthermore on this shaft 44 is a sprocket 45 which is connected by means of a chain 46 with a sprocket 47 fixed upon a crank shaft 48 supported in brackets 49 extending from the lower end of the sleeve 32. On this crank shaft 48 are formed crank arms 50 carrying pedals 51 convenient to access from the driver's seat 22. Thus when the driver operates the pedals 51 motion will be transmitted through the various sprocket chains and the machine thus will be driven rapidly along the ground. At the same time the helix will be caused to rotate through the medium of the beveled gears and will lift the device in the air.

In order to steer the device while moving over the ground there is provided at one side of the driver's seat a lever 52 which works in a quadrant guide 53 and is provided with a handle 54 which projects up adjacent the driver's seat. This lever 52 is connected by means of a link 55 with an arm 56 carried on a rock shaft 57 which is journaled in one of the brace members 21. This rock shaft 57 is also provided with a rock arm 58 wherein is a slot 59 and a pin 60 on the bar 29 is received in this slot so that as the lever is moved in like manner will the ground wheel at the front of the device be caused to turn to the right or left, thus steering the device over the ground.

In order to steer the device while in the air there are attached to the frame certain brace members 61 at the upper part thereof and certain other lower brace members 62. Journaled in these brace members is a vertical shaft 63 whereon is a frame 64 carrying a fabric 65 thus forming a rudder lying in a vertical plane. At the driver's seat is pivoted a lever 66 having the usual handle 67 and connected at its lower end by a link 68 to a link 69 which is in turn connected to an arm 70 projecting from the member 63 so that as the lever 66 is operated the rudder will be caused to move to one side or the other.

In order to regulate the position of the shaft 33 with reference to the horizontal there is provided on the sleeve 32 a boss 71 carrying a stub shaft 72 whereon is mounted a drum 73 having a handle 74 projecting therefrom. Around this drum is wound an endless cord 75 and at the forward end of the device the frames carry downwardly projecting braces 76 which in turn support sheaves 77. At the rear end of the machine the braces 62 are continued downwardly and support a sheave 78. The lower ends of the braces 62 and 76 are connected by a horizontal rod 79. The endless band or cord 75 is trained over these pulleys and is connected to a carriage 80 wherein is supported a flange wheel 81 which rides upon the rod 79. Depending from this carriage is a yoke 82 provided with a downwardly extending stem 83 whereon a counterweight 84 is held by means of a nut 85. In operating this portion of the device when it is desired to ascend in a vertical direction the counterweight 84 is moved along the rod 79 by rotating the drum 73 until the shaft 33 is vertical. The motion will be directly upward except for the drift occasioned by the wind or other current of air, and this drift may be compensated for by moving the weight 84 along the rod 79 and properly adjusting the rudder 65 until the operator no longer observes the earth moving beneath him.

When it is desired to move the device in a forward direction the weight 84 is run forward on the rod 79 and according to the position of this weight a certain proportion of the lifting force will be used as a propulsive force. In like manner by moving the weight backward the machine may be made to move backward.

It will be obvious that while the crank shaft here shown is operated by man power any suitable form of engine may be employed to actuate the crank shaft without altering the remainder of the device.

It is obvious that many minor changes may be made in the form and construction of the invention without departing from the material principles thereof and it is therefore not wished to confine the invention to the exact form herein shown and described, but it is wished to include all such as properly come within the scope claimed.

Having thus described the invention, what is claimed as new, is:—

1. In a device of the kind described, a pair of bicycle frames, steering and driving wheels carried by said frames, transverse members connecting said frames in parallel relation, a sleeve extending vertically with reference to said frames, a shaft rotatable in said sleeve and having a collar on the upper end of the sleeve to limit the movement of the shaft through the sleeve, a helix on the upper end of the shaft, braces extending from said collar to said helix, means to drive said driving wheels and shaft, and means to steer said machine.

2. In a device of the kind described, a pair of bicycle frames, steering and driving wheels carried by said frames, transverse members connecting said frames in parallel relation, a sleeve extending vertically with reference to said frame, a shaft rotatable in said sleeve and having a collar on the upper end of the sleeve to limit the movement of the shaft through the sleeve, a helix on the upper end of the shaft, braces extending from said collar to said helix, means to drive said driving wheels and shaft, means to steer said machine, and means to vary the center of gravity of the machine.

In testimony whereof I hereunto affix my signature in presence of two witnesses.

VINCENTE LENOARD RODRIGUEZ.

Witnesses:
DANIEL J. TRAVIS,
JOHN PETERSON.